United States Patent Office 3,518,176
Patented June 30, 1970

---

3,518,176
GRAFT POLYMERIZATION OF STARCH IN NOVEL ALCOHOL REACTION MEDIUM
Zoila Reyes, Menlo Park, Calif., and Charles R. Russell, Peoria, Ill., assignors to the United States of America as represented by the Secretary of Agriculture
No Drawing. Filed Feb. 25, 1966, Ser. No. 529,947
Int. Cl. C08f 1/16
U.S. Cl. 204—159.12     5 Claims

ABSTRACT OF THE DISCLOSURE

Process for graft polymerizing onto a starch, amylose, or amylopectin, a vinyl monomer in an aqueous medium, the improvement comprising replacing the water with an equal volume of ethylene glycol, glycerol, n-butanol, sorbitol, or dimethylformamide. The reaction is catalyzed by radiation or ceric-ion catalysts.

---

A nonexclusive, irrevocable royalty-free license in the invention herein described, throughout the world for all purposes of the United States Government, with the power to grant sublicenses for such purposes, is hereby granted to the Government of the United States of America.

This invention relates to an improved grafting process for producing highly dispersible and widely useful graft polymers of polysacchardies such as starch, amylose, amylopectin, etc. with relatively low molecular weight linear side chain homopolymers derived from a vinyl type compound such as acrylic acid, acrylamide, acrylonitrile, or methyl methacrylate.

More particularly this invention relates to the unobvious discovery that the addition of a substantial excess of a hydroxyl-containing compound, preferably a polyol such as ethylene glycol, propylene glycol, or glycerol, or of an alcohol such as n-butanol or an organic acid such as acetic acid, or in the presence of ceric ions, dimethyl formamide, to the conventional aqueous reaction medium for grafting a said vinyl type monomer onto the skeleton of an irradiated or ceric ammonium nitrate-activated polysaccharide such as starch, amylose, amylopectin, etc. results exclusively in the formation of polysaccharide graft copolymers wherein, depending on the specific polysaccharide substrate, the particular unsaturated monomer, and the polyol, the frequency (D.S.) of the grafted branches is increased by a factor of at least about 25, e.g., from a range of about 2350–15,800 AGU's per branch to a range of only about 115–1315 AGU's per branch, which greatly increases in D.S. are accompanied by similarly striking reductions in the length and molecular weight of the grafted side chains so that our novel graft copolymers conspicuously differ from those formed in a simply aqueous reaction medium by a greatly increased graft frequency, a markedly lowered D.P. of the side chain homopolymers, and by exhibiting not only distinctly improved solubilities or dispersibilities but unobviously low and thusly useful vscosities at high solids concentration.

Although we are uncertain as to the exact manner in which the glycol or alcohol additive exerts its effects, the additive apparently greatly increases the number of active or receptor sites on the polysaccharide backbone while drastically limiting the tendency especially of relatively short homopolymer chains to continue growing. Our glycol containing graft copolymerization medium also inhibits the prior art formation of unwanted free homopolymer, thus providing maximal yields of our highly grafted polysaccharides in which the great increase in frequency of the side chain homopolymers and the low molecular weight of the side chains due to their low degree of polymerization together somehow provide greatly increased dispersibility and highly useful solutions or dispersions in media such as water, dilute alkali, and some organic solvents. As will be apparent from a study of Table 1, infra, which compares the very workable viscosities exhibited by our improved starch-vinyl monomer grafts with the prohibitively excessive viscosities of grafts prepared in water without one of our additives, dispersions of our improved graft polymers are eminently, advantageous and practical as flocculents, retention aids for pigments, as sizing agents for paper and textiles, as film-forming and molding resins, and in other industrial applications where high solubility or dispersibility and good flow propertes are required.

British Pat. No. 869,501 teaches the grafting of starch with an ethylenically unsaturated monomer such as styrene, vinyl toluene, methyl methacrylate, acrylamide, acrylonitrile, vinyl acetate, etc., in an aqueous system containing an initiator such as an organic peroxide or a ceric salt, e.g., ceric ammonimum nitrate, it being suggested that undesired extents of copolymerization may be prevented by the addition of a stopping agent such as hydroquinone. It is clear, however, that the addition of a stopping agent after the graft copolymerization has been in progress for a considerable period does not depolymerize the already formed high molecular weight vinyl-type homopolymer side chains that have rapidly lengthened because of the strong tendency for a graft chain, once started, to continue its growth. The product thus is starch containing rather infrequent high molecular side chains and is too insoluble to be operative for applicant's purposes.

Hagemeyer, U.S. Pat. No. 2,763,627, teaches the modification of polyacrylonitrile, polyvinyl acetate, polymethacrylates, and mixtures thereof, by copolymerizing the respective monomer and a minor proportion of an amylose material in an aqueous system containing a peroxide or a peroxy acid salt and preferably containing a chain regulating alkyl mercaptan. Thus, Hagemeyer actually teaches the homopolymerization of acrylonitrile accompanied by a very minor extent of grafting with amylose. We have repeated Hagemeyer's examples and were at first similarly deceived by an inability to separate the product by ordinary extraction procedures, rigorous characterizations showed the products to consist mainly of intimate mixtures of starch per se and free homopolymer that are of no use for the purposes of the instant invention.

Hagemeyer et al., U.S. Pat. No. 2,865,872, extends the teachings of U.S. Pat. No. 2,763,627 to modifications with cellulose derivatives in place of amylose or amylose derivatives, and the resulting products resemble those of Hagemeyer, U.S. Pat. No. 2,763,627.

Thus, our invention comprises the discovery that when graft copolymerizations of starch with unsaturated monomers are conducted in the presence of the above mentioned hydroxyl-containing compounds, and particularly when slightly aqueous solutions of the hydroxyl compound, e.g., 4:1 mixtures of the hydroxyl compounds and water are substituted for the conventional completely aqueous solvent in a system for grafting vinyl-type monomers onto starch or related polysaccharides, particularly in a preirradiated system, the said hydroxyl-containing additives or aqueous solutions containing the same function as uniquely effective chain control agents in that they apparently promote extensive diffusion of the unreacted unsaturated monomer into the starch and thus promote the utilization of the irradiation-produced free radicals while effectively limiting the tendency of unterminated graft homopolymer chains to continue growing so long as monomer is available but without at the same time promoting the formation of free vinyl-type homopolymer that results when a conventional chain transfer agent is included in or added to the reaction mixture. Inert amide type solvents such as DMF, hexamethylphosphoramide, or dimethylacetamide may be employed in place of a preferred hydroxyl-containing component in a preirradiated system, but dioxane DMF, or dimethylacetamide should be used in ceric catalyzed systems to avoid a reaction of the ceric ion with the hydroxyl-containing compound thus causing a competing redox system that lowers the grafting efficiency.

From the foregoing presentation it will be appreciated that a principal object of the invention is an improved process for forming much more highly substituted vinyl-type graft copolymers of starch and related polysaccharides. Another object is the preparation of a much more dispersible and useful class of relatively more highly substituted graft copolymers of polysaccharides with vinyl-type unsaturated compounds, which graft copolymers are distinguished from the pertinent prior art grafts by a roughly 25-fold increase in D.S. per anhydroglucose unit (AGU) of the polysaccharide, the engrafted branches of our improved copolymers being limited to relatively short, low molecular weight homopolymeric chains so that the graft copolymers are readily dispersible in a variety of solvents, and have improved value as sizing agents and wet strength additives for paper, adhesives, pigment retention aids, and as dispersing or emulsifying agents.

Another object is a modified free radical process for grafting vinyl-type monomers onto polysaccharides wherein macro radicals, i.e., those formed on the polysaccharide skeleton instead of the relatively micro extraneous radicals in the supporting solution initiate the grafting process, thereby almost completely avoiding the formation of vinyl-type homopolymer, large amounts of which unwanted byproducts are formed when the free radicals are present in the supporting solution rather than in the very high molecular weight polysaccharide backbone.

A more specific object is the discovery of reaction media for improved graft copolymerizations with vinyl-type monomers, the hydroxyl-containing organic solvent component of which makes the polysaccharide much more receptive to grafting and thus greatly increases the side chain frequency while acting as chain control agents to sharply limit the length of the engrafted homopolymer side chains.

The following examples and data are intended to illustrate the preferred embodiments of our invention.

EXAMPLE 1

Unmodified wheat starch 8.1 g., dry basis (0.05 mole) was irradiated under nitrogen in a cobalt 60 gamma ray source to a total dose of 20 mrep. The irradiated starch was then dispersed under nitrogen in 106 g. of ethylene glycol containing 10.6 g. (0.2 mole) of dissolved acrylonitrile (AN), and the mixture was allowed to react for 1 hour at 50° C. After filtration, the product was washed with methanol, extracted with dimethylformamide (DMF), rewashed with methanol, and dried. The purified starch graft copolymer (8.00 g.), by Dumas analysis for nitrogen, contained 10.7 percent AN. A 1-gram sample of the isolated graft polymer was hydrolyzed by refluxing the magnetically stirred material in 80 ml. of 0.5 N HCl for 2½ hours. The water-insoluble fraction, i.e., liberated polyacrylonitrile (PAN) was then collected and purified by dissolution in DMF followed by precipitation therefrom with a 50–50 mixture of ethanol and iso-octane. A viscometric determination of the molecular weight of the thusly obtained polyacrylonitrile branches was carried out.

The intrinsic viscosity $[\eta]$ in DMF was 0.08, and the corresponding viscosity average molecular weight $\overline{M}_v$ calculated from this and the equation $[\eta]=2.43\times 10^{-4}\overline{M}_v^{0.75}$ was 2,273, which corresponds to 117 anhydroglucose units (AGU) per polyacrylonitrile (PAN) branch. Under prior art conditions, using water in place of ethylene glycol, the intrinsic viscosity of the PAN obtained from the acid hydrolyzate of the graft was 2.40 instead of 0.08 and the corresponding $\overline{M}_v$ was 211,800, so that the number of anhydroglucose units per PAN branch was 2,560, i.e., it had only about 1/22 as many grafted sites per molecule of starch as were obtained by substituting ethylene glycol for the water.

EXAMPLE 2

Unmodified wheat starch, 16.2 g. dry basis (0.10 mole) was preirradiated as in Example 1. The irradiated starch was then dispersed under nitrogen in a solution of 15.9 g. (0.30 mole) of acrylonitrile in 124 g. of ethylene glycol and reacted for 1 hour at 50° C. The yield of starch graft copolymer, isolated as in Example 1, was 16.53 g. The nitrogen content of 2.03 percent corresponded to an acrylonitrile content of 7.68 percent. The side chains liberated by hydrolysis as in Example 1 had an intrinsic viscosity $[\eta]$ in DMF of 0.495 corresponding to an average viscosity molecular weight $\overline{M}_v$ of 13,650 which corresponds to 1 polyacrylonitrile branch per 1,020 AGU's. Under precisely the same conditions excepting that 124 g. of water was substituted for the ethylene glycol solvent, the yield of starch graft copolymer was 15.77 g. analyzing 1.83 percent N which corresponds to 6.93 percent acrylonitrile. The hydrolysis-liberated PAN was found to have an $[\eta]$ value of 1.45 corresponding to a molecular weight of 55,080 that in turn corresponded to the presence of 1 PAN branch per 4,070 AGU's of starch.

EXAMPLE 3

Example 2 was repeated excepting that the reaction solvent consisted of a mixture of 118 g. of ethylene glycol and 6 g. of water. The yield of starch graft copolymer was 20.63 g. analyzing 4.08 percent N corresponding to an acrylonitrile content of 15.45 percent. The intrinsic viscosity of the liberated PAN side chains was 0.645 corresponding to $\overline{M}_v$ of 19,410, from which molecular weight value it was determined that the starch graft copolymer containing 1 PAN branch per every 652 AGU's. It is apparent that the presence of a small percentage of water in the reaction solvent promotes the access of the glycol to the starch chains.

EXAMPLE 4

Amylose, 8.1 g. dry basis (0.05 mole) that was irradiated as in Example 1 was substituted for the starch thereof and reacted as in Example 1 with 10.6 g. of acrylonitrile contained in 106 g. of ethylene glycol. The yield of amylose graft copolymer was 8.94 g. containing 4.30 percent N corresponding to 16.30 percent AN. The $[\eta]$ value of 0.792 in DMF corresponded to $\overline{M}_v=25,534$ from which average molecular weight it was determined that the PAN substitution amounted to 1 branch per every 805 AGU's of the amylose.

When the above reaction was repeated with the exception that 106 g. of water was substituted for the ethylene glycol the yield of graft copolymer was 8.14 g. analyzing 2.37 percent N representing an AN content of 8.97 percent. The $[\eta]$ of the liberated branches were 2.425 representing a $\overline{M}_v$ of 113,660 and indicating that there was 1 PAN branch per every 7,120 AGU's.

EXAMPLE 5

Example 4 was repeated, 8.1 g. of irradiated amylopectin being substituted for the amylose. Using 106 g. of ethylene glycol as the reaction solvent, the amylopectin graft copolymer was obtained in a yield of 7.45 g. having a N content of 2.24 percent corresponding to an AN content of 8.50 percent; $[\eta]=0.652$; $\overline{M}_v=19,814$; 1 PAN branch per every 1,315 AGU's.

Repeating with 106 g. of water in place of the ethylene glycol, the yield of amylopectin graft copolymer was 9.05 g. containing 2.52 percent N corresponding to 9.54 percent AN; $[\eta]=2.093$; $\overline{M}_v=92,870$; 1 PAN branch per 5,500 AGU's.

EXAMPLE 6

Wheat starch, 40.5 g. dry basis (0.25 mole) was dispersed in 474 ml. of water-DMF mixture (1:1 by volume) in a 1-liter, 3-neck flask, equipped with stirrer, reflux condenser, and gas inlet and outlet tubes. The dispersion was stirred and purged with nitrogen for 30 minutes at 30° C.; freshly distilled methyl methacrylate (MMA), 50.0 g. (0.5 mole) was added, and after stirring under nitrogen for 15 minutes, the catalyst, i.e., 26 ml. of 0.095 N ceric ammonium nitrate (CAN) solution in 1 N $HNO_3$, was rapidly dropped in. Then, the mixture was allowed to react for 2 hours at 30° C. with continuous stirring under nitrogen. The product was filtered, washed with water and with methanol. Afterward, it was exhaustively extracted with acetone to remove the homopolymer produced (12.0 g. of polymethyl methacrylate, PMMA, being removed), and dried in a vacuum oven at 40° C., yield: 60.7 g. Acid hydrolysis of a sample of the graft yielded starch-free PMMA, which amounted to 40 percent of the original weight of the dry sample; therefore, the percent grafting was 40. The molecular weight of this starch-free PMMA was determined viscometrically using the equation: $[\eta]=2.45\times 10^{-5}\overline{M}_v^{0.80}$. Since the value of $[\eta]=0.167$ in acetone, $\overline{M}_v=62,000$, which corresponds to 575 AGU per PMMA branch.

A graft prepared under the same conditions, except that water was used as solvent medium instead of the aqueous DMF, contained 45.2 percent grafted MMA, and the molecular weight of the grafted branch ($[\eta]=1.65$) was 1,084,000; thus, the AGU/branch was 8,114, i.e., the number of branches was 1/14 that of the sample obtained in aqueous DMF.

EXAMPLE 7

Wheat starch, 4.05 g. dry basis (0.025 mole) preirradiated with gamma rays to a dose of 5 mrad was dispersed under nitrogen in 50 ml. of a 1.5 molar solution of acylamide, AA (5.3 g. of AA made up to 50 ml. with water). The mixture was allowed to react under nitrogen, with continuous stirring for 2 hours at 30° C.; then it was poured into two volumes of methanol and the precipitated product was filtered, washed with methanol and dried at 40° C. in a vacuum oven. Yield: 6.4 g. of AA-starch graft containing 34.4 percent grafted AA. For analysis, a 1-g. sample of the graft was hydrolyzed by dispersing it at room temperature in 10 ml. of 6 N HCl, and warming the mixture on a steam bath for 2 minutes. The clear solution obtained was cooled in an ice bath and treated with two volumes of cold methanol. A precipitate which formed was collected, washed with methanol, and redissolved in water. After a second precipitation from this solvent by methanol, the solid was extracted with DMF to remove starch hydrolysis products and dissolved in a mixture of formamide-acetic acid (1:1 by vol.). After filtering, the solution was treated with methanol to precipitate the PAA. The molecular weight of this PAA was determined viscometrically by means of equation: $[\eta]=3.73\times 10^{-4}\overline{M}_w^{0.66}$ and the intrinsic viscosity measured in 1 N sodium nitrate. $\overline{M}_w$ was 355,000; therefore, there are 4,120 AGU per PAA branch in the graft. By simply replacing a large part (80 percent) of the water by respectively ethylene glycol, n-butanol, glycerol, or sorbitol, starch grafts containing far fewer AGU's per PAA branch, i.e., containing a much larger number of PAA branches, were produced under otherwise identical reaction conditions. The following results were obtained by using a 1:4 mixed solvent medium for the reaction:

| Solvent mixture—organic solvent: water 4:1 | Graft yield, g. | AA in graft, percent | $\overline{M}_w$ | AGU/PAA branch |
|---|---|---|---|---|
| Ethylene glycol | 6.8 | 36.3 | 38,000 | 410 |
| n-Butyl alcohol | 5.0 | 16.6 | 18,000 | 560 |
| Glycerol | 7.8 | 44.0 | 110,000 | 864 |
| Sorbitol | 7.8 | 43.8 | 180,000 | 1,425 |

In comparison with the reaction performed in water, the number of PAA branches in the graft was increased by 10, 7, 5, or 3 times by replacing 80 percent of the water by ethylene glycol, butyl alcohol, glycerol, and sorbitol, respectively.

EXAMPLE 8

Wheat starch, 16.2 g. dry basis (0.1 mole) preirradiated to a dose of 5 mrad was dispersed under nitrogen in a solution of 14.4 g. (0.2 mole) of acrylic acid (AAc) in 189.6 g. of a mixture of water-ethylene glycol (1:4 by volume). The resulting mixture was allowed to react under nitrogen at 30° C. for 2 hours; then 200 ml. of methanol was added and the product separated by centrifugation. After washing with 200 ml. of additional methanol, the product was dried in a vacuum oven at 40° C. Yield: 17.93 g. of an AAc-starch graft with a 9.1 percent AAc (determined by potentiometric titration). For hydrolysis, a 5-g. sample of the graft was suspended in 50 ml. of water and heated on a steam bath for 3 minutes. Concentrated HCl (50 ml.) was carefully added, and after stirring on a steam bath for 2 minutes, the solution was cooled to 4° C. in Dry Ice. Polyacrylic acid (PAAc) precipitated and was filtered, and washed three times with cold 6 N HCl. The PAAc was then converted to the sodium salt by dissolving it in a solution of 1.20 g. of 100 ml. of water (excess NaOH), and the solution was treated with 100 ml. of cold 95% to precipitate the sodium polyacrylate. The salt was filtered, washed with ethanol and dried for 12 hours at 40° C. The intrinsic viscosity $[\eta]$ of a solution of the salt in 1 N NaCl was 0.36, and the molecular weight $\overline{M}_w$, calculated from $[\eta]$ and the equation $[\eta]=3.75\times 10^{-4}\overline{M}_w^{0.64}$ from 45,190; then the AGU/branch was 2,817.

In an experiment conducted under identical conditions except that a water-acetic acid mixture (1:3 by volume) was used as solvent medium for the reaction, 19.7 g. of AAc-starch graft was obtained with 13.8 percent AAc content. The $[\eta]$ viscosity of the PAAc obtained on hydrolysis of a sample of the graft was 0.15, and $\overline{M}_w=11,330$; therefore, the AGU/branch=437.

When the reaction was carried out in water under identical conditions, the product, 18.6 g., was an AAc-starch graft, with 17.3 percent AAc. The $\overline{M}_w$ of the grafted PAAc obtained on hydrolysis of the graft was 538,000 ($[\eta]=1.75$), and the AGU/branch value was 15,800. Consequently, this graft contained only 1/36 as many branches as the graft prepared in aqueous acetic acid, and ⅕ as many the product obtained from aqueous ethylene glycol.

PASTE VISCOSITIES OF STARCHES GRAFTED IN WATER vs. IN ETHYLENE GLYCOL/WATER AND IN WATER/DMF

| Graft copolymer | Initiator | Reaction medium | Viscosity (cps.) of 10% solution of graft copolymer at 25° C. in solvent | |
|---|---|---|---|---|
| AN-starch (control). | γ-Ray | Water | 17,700 | DMSO. |
| AN-starch (of Ex. 3). | ...do | Water-EG | 120 | DMSO. |
| AA-starch (control). | ...do | Water | 14,420 | Water. |
| AA-starch (of Ex. 7). | ...do | Water-EG | 8,800 | Do. |
| AAc-starch (control). | ...do | Water | 11,700 | Do. |
| AAc-starch (of Ex. 8). | ...do | Water-EG | 220 | Do. |
| MMA-starch (control). | Ceric ion | Water | 29,000 | DMSO. |
| MMA-starch (of Ex. 6). | ...do | Water-DMF | 1,700 | DMSO. |

The strikingly lower viscosities of our graft copolymers make their high solids solutions usable, for example, in high speed paper coating and sizing operations and in pigment formulations for the printing industry. The greatly lowered viscosities also indicate the greatly increased solubilities and dispersibilities of our improved starch grafts.

We claim:

1. In a process for graft copolymerizing a pre-irradiated polysaccharide selected from the group consisting of starch, amylose, and amylopectin with from about 0.4 mole to about 4 moles per mole of said polysaccharide of vinyl monomer selected from the group consisting of acrylic acid, acrylamide, and methyl methacrylate in a wholly aqueous reaction medium, the improvement comprising the step of conducting the copolymerization in a reaction medium in which not less than about three-fourths of the content of water has been replaced by an equal volume of an alcohol selected from the group consisting of ethylene glycol, glycerol, n-butanol, and sorbitol.

2. A polysaccharide graft copolymer produced by the improved process as defined in claim 1 wherein the polysaccharide is wheat starch, the vinyl monomer is 4 moles of acrylonitrile per mole of starch, and the improved reaction medium is that in which 100 percent of the water has been replaced by an equal volume of ethylene glycol, the thereby produced graft copolymer being further characterized by the presence on the average of about one grafted side chain per every 117 AGU's of the starch.

3. A polysaccharide graft copolymer produced by the improved process as defined in claim 1 wherein the polysaccharide is wheat starch, the vinyl monomer is 3 moles of acrylamide per mole of starch, and the improved reaction medium is that in which four-fifths of the water has been replaced by an equal volume of ethylene glycol, the thereby produced graft copolymer being further characterized by the presence on the average of about one polyacrylamide side chain per every 410 AGU's of starch.

4. In a ceric ammonium nitrate catalyzed process for graft copolymerizing starch with methyl methacrylate in a wholly aqueous reaction medium, the improvement comprising the step of conducting the copolymerization in a reaction medium in which one-half of the water has been replaced by an equal volume of dimethylformamide.

5. The graft copolymer formed by the process of claim 4 wherein 2 moles of the methyl methacrylate are reacted per mole of starch, said graft copolymer being characterized by an average of about one polymethylacrylate side chain for every 575 starch AGU's.

References Cited

UNITED STATES PATENTS 3,461,052   8/1969   Restaino _____ 204—159.12

MURRAY TILLMAN, Primary Examiner

R. B. TURER, Assistant Examiner

U.S. Cl. X.R.

260—17.4